United States Patent
Kusakabe

(10) Patent No.: US 6,280,044 B1
(45) Date of Patent: Aug. 28, 2001

(54) SPREAD ILLUMINATING APPARATUS WITH A UNIFORM ILLUMINATION

(75) Inventor: Kiyoshi Kusakabe, Shizuoka-ken (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 09/603,954

(22) Filed: Jun. 26, 2000

(30) Foreign Application Priority Data

Jun. 28, 1999 (JP) ................................. 11-181525

(51) Int. Cl.$^7$ ..................................................... F21V 8/00
(52) U.S. Cl. .......................... 362/31; 362/551; 362/558
(58) Field of Search ............................... 362/26, 27, 31, 362/560, 561, 558, 556, 551; 385/47, 50

(56) References Cited

U.S. PATENT DOCUMENTS

| | | | |
|---|---|---|---|
| 5,432,876 | * 7/1995 | Appeldorn | 385/31 |
| 5,664,862 | * 9/1997 | Redmond | 362/31 |
| 5,857,761 | * 1/1999 | Abe | 362/551 |
| 5,915,855 | 6/1999 | Murase et al. | 40/546 |

* cited by examiner

*Primary Examiner*—Alan Cariaso
*Assistant Examiner*—Hargobind S. Sawhney
(74) *Attorney, Agent, or Firm*—Oliff & Berridge, PLC

(57) ABSTRACT

The light dispersion portion is formed with the grooves having an identical depth D, and the spacing P between the light dispersions 15 is set 0.01 mm minimum and 0.2 mm maximum. In order to prevent the stripe pattern of brightness and darkness generated due to the light reflection at the light dispersion portion 15, it is preferable to make the spacing as small as possible. However, too small spacing makes it difficult to ensure workability. Accordingly, the minimum value of spacing is set 0.01 mm in view of workability. And, the maximum value of spacing is set 0.2 mm, which does not allow visual recognition of the stripe of brightness and darkness.

4 Claims, 3 Drawing Sheets

SPREAD ILLUMINATING APPARATUS WITH A UNIFORM ILLUMINATION

BACKGROUND OF THE INVENTION

1. Field of the Invention

The present invention relates to a spread illuminating apparatus as an illuminating means for signboards, various kinds of reflection-type displays and so on, in particular, as an illuminating means for a liquid crystal display.

2. Related Art

As an auxiliary illuminating apparatus for illuminating a screen of a reflection-type liquid crystal display uniformly, the present inventors proposed the spread illuminating apparatus (patent application Ser. No. 182076/98), an outline of which will be explained hereinafter with reference to FIG. 4. This illuminating apparatus 1 is disclosed as a prior art. The spread illuminating apparatus 1 is disposed to cover a screen F (front surface) of a reflection-type liquid crystal display element L. The apparatus comprises a plate-like transparent substrate 2 rectangular in section and made of a highly light permeable material, and a light source portion 4 provided close to one end surface 3 of the transparent substrate 2. The transparent substrate 2 may be wedge-shaped for reducing its weight. Here, in FIG. 4, one surface of the transparent substrate 2 abutting on the reflection-type liquid crystal element L will be denoted as a lower surface 5 and a viewing surface (screen) on the opposite surface as an upper surface (front surface) 6.

As shown in FIG. 5, the light source portion 4 is formed with a bar-like light conductive member 7 and spot-like light sources 9 such as light emitting diodes provided to both ends 8 of the light conductive member 7. An optical path conversion means 11 to be explained later in details is formed on one surface of the light conductive member 7, whose longitudinal surfaces except the one opposing the transparent substrate 2 are covered with a light reflection member (reflector) 12 in order to introduce light beams traveling through the light conductive member 7 into the transparent substrate 2 in a high degree of efficiency.

The optical path conversion means 11 is formed on a surface 14 opposite to a surface 13 facing the end surface 3 of the transparent substrate 2, and comprises a light dispersion portion 15 (black portion in FIG. 5) with a partial coarsening work to form a minutely rugged portion and a plane portion 16 without the coarsening work. Since light beams reflected by the light dispersion portion 15 exit out the surface 13 and enter the transparent substrate 2 in a larger amount than those by the plane portion 16 due to the formation of the minutely rugged portion, the light dispersion portion 15 is so formed as to increase its area as it gets away from the spot-like light source 9.

Thus, the optical path conversion means 11 is formed in consideration of a balance between the distance from the spot-like light source 9 and the area of the light dispersion portion 15, whereby the light beams are uniformly emitted from the surface 13 facing the end surface 3 of the transparent substrate 2 in spite of the fact that the spot-like light source 9 is provided to the end portion 8 of the light conductive member 7, so the light source portion 4 formed with the spot-like light source 9 and the light conductive member 7 functions similar to a fluorescent lamp (cold cathode fluorescent and hot cathode fluorescent lamps, etc.) as a bar-like light source.

And, a light reflection pattern 17 is formed on the upper surface 6 of the transparent substrate 2. The light reflection pattern 17 is constituted with a number of grooves 18 approximately triangular in section and plane portions 19 adjacent to the grooves 18 formed along the end surface 3. The light reflection pattern 17 is formed so that the interval between the grooves 18 varies from spot to spot in order to achieve a uniform emitting of spread illumination from the transparent substrate 2 independent of the distance from the light source 4. That is, the ratio of the width (occupied area) of the groove 18 to the width (occupied area) of the plane portion 19 is set to gradually increase as the groove 18 gets away from the end surface 3 of the transparent substrate 2. For reference, since the grooves 18 of the light reflection pattern 17 formed on the transparent substrate 2 are quite minute, they cannot be visually recognized when viewing a screen.

When such a spread illuminating apparatus 1 is disposed in such a manner as to cover the upper surface of the reflection-type liquid crystal element L, the light beams emitted from the light source portion 4 enter the transparent substrate 2 from the end surface 3, and travel toward the opposite surface 10 as they repeat reflection and refraction therein. Meanwhile, the light beams emitted from the lower surface 5 of the transparent substrate 2 illuminate the reflection-type liquid crystal element L, thereby brightening the screen. Since the amount of light emitted from the lower surface 5 is approximately uniform independent of the distance from the light source portion 4 due to the formation of the light reflection pattern 17, the reflection-type liquid crystal element L can be illuminated in a spread manner.

And, although the spot-like light source 9 is provided to both ends 8,8 of the light conductive member 7 respectively in FIGS. 4 and 5, it may be provided to either one end 8. Moreover, the above discussed optical path conversion means 11 formed on the light conductive member 7 is constituted with a light dispersion portion 15 consisting of a minutely rugged surface and a plane portion 16, but it can be alternately constituted with a portion coated with material containing light dispersion substance and a portion without such a coating, or with a portion with a groove whose reflection angle is set to make reflected light beams enter the transparent substrate 2 and a portion without such a groove.

Now, since the light source portion 4 of the spread illuminating apparatus 1 is formed with the light conductive member 7 and the spot-like light source 9, there has been such a problem as mentioned below. That is, when viewing the screen on the above described spread illuminating apparatus 1 disposed to cover the viewing surface F of the liquid crystal display L, it was found that a stripe pattern of brightness and darkness can be generated orthogonally to the end surface 3, which prevents a uniform spread emitting, causing difficulty in viewing the screen.

This stripe pattern of brightness and darkness was found to be caused by the optical path conversion means 11 provided on the light conductive member 7. That is, while most of the light beams reflected on the light dispersion portion 15 of the optical conversion means 11 exit out the surface 13 and travel into the transparent substrate 2, most of the light beams reflected on the plane portion 16 do not exit out the surface 13 due to a total reflection, so, depending on the condition settled in the light reflection pattern consisting of the light dispersion portion 15 and the plane portion 16, the brightness of the light emitted from the surface 13 becomes uneven. In this case, since the brightness of the light beams entering the transparent substrate 2 is not uniform, the stripe pattern of brightness and darkness orthogonal to the end surface 3 is generated on the screen.

The present invention has been made in the light of the above problem, and an object thereof is to make uniform the brightness of the light beams entering the transparent substrate for achieving a uniform spread illumination in a spread illuminating apparatus.

In order to solve the above problem, according to a first aspect of the present invention, in a side light type of a spread illuminating apparatus in which a bar-like light source is provided close to an end surface of a transparent substrate made of light permeable material, the bar-like light source is formed with a light conductive member made of the light permeable material provided close to and along at least one end surface of the transparent substrate, and a spot-like light source provided to at least one end of the light conductive member, and an optical path conversion means formed with grooves having an identical depth and spaced as closely as workability can allow is provided at least on a surface of the light conductive member opposite to the surface facing the transparent substrate.

In the present invention, since the optical path conversion means of the light conductive member is formed with a light dispersion portion consisting of the grooves having the identical depth and being disposed at a smallest spacing machining can allow, the light beams emitted from the spot-like light source are refracted at the light dispersion portion, and when the light enters the transparent substrate, the brightness of the light is made uniform to the extent that the brightness cannot be visually recognized as uneven. And, the generation of the stripe pattern of brightness and darkness on the screen illuminated through the transparent substrate due to the light reflection at the light dispersion portion is prevented.

Further, according to a second aspect of the present invention, a spacing of the light dispersion portion of the optical path conversion means is set between 0.01 mm to 0.2 mm, which enables the light dispersion portion of the optical path conversion means to have a spacing small enough to prevent generating the stripe pattern of the brightness and darkness and which also allows for the machinability.

Further, according to a third aspect of the present invention, the spacing between the light dispersion portions of the optical path conversion means is set smaller at a farther spot from the spot-like light source. By this invention, the lowering of the brightness due to getting away from the spot-like light source is supplemented by increasing the number of the light dispersion portions per unit of length of the light conductive member to make the brightness uniform everywhere on the light conductive member.

Further, according to a fourth aspect of the present invention, the spot-like light sources are provided to both ends of the light conductive member and the spacing between the light dispersion portions of the optical path conversion means is set smallest at the central portion and is gradually widened toward both ends.

By this structure, since the spot-like light source is provided to both ends of the light conductive member, the brightness of the light conductive member becomes lowest at the center thereof. Therefore, the number of the light dispersion portions per unit of length of the light conductive member is increased as approaching the central portion, whereby the lowering of the brightness due to getting away from the spot-like light source is supplemented to obtain a uniform brightness everywhere on the whole light conductive member. Now, according to this structure, the brightness of the light conductive member is increased as a whole, so the generation of the stripe pattern of the brightness and darkness on the surface to be illuminated through the transparent substrate due to the light reflection at the light dispersion portion is prevented, and the brightness of the spread illuminating apparatus as a whole is increased.

Further, according to a fifth aspect of the present invention, the length of the light conductive member per spot-like light source is set to 30 mm or less. By this constitution, the remarkable lowering of the brightness due to getting away from the spot-like light source is prevented.

Embodiment

Hereinafter, an embodiment of the present invention is explained referring to the attached drawings. The same signs are used for the portions identical or corresponding in the conventional art, and detailed explanations thereof are omitted.

Figure 1:
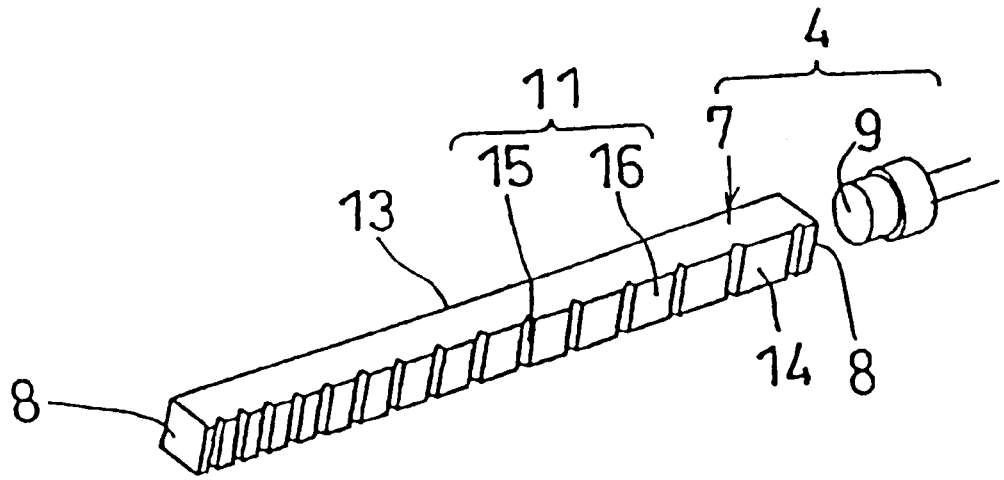
FIG. 1 is a perspective view of the light conductive member of the spread illuminating apparatus of the embodiment of the present invention, simplified for explanation's sake.

In FIG. 1, a light conductive member 7 used in an illuminating apparatus by an embodiment of the present invention is shown with simplification for the sake of explanation.

Figure 4:
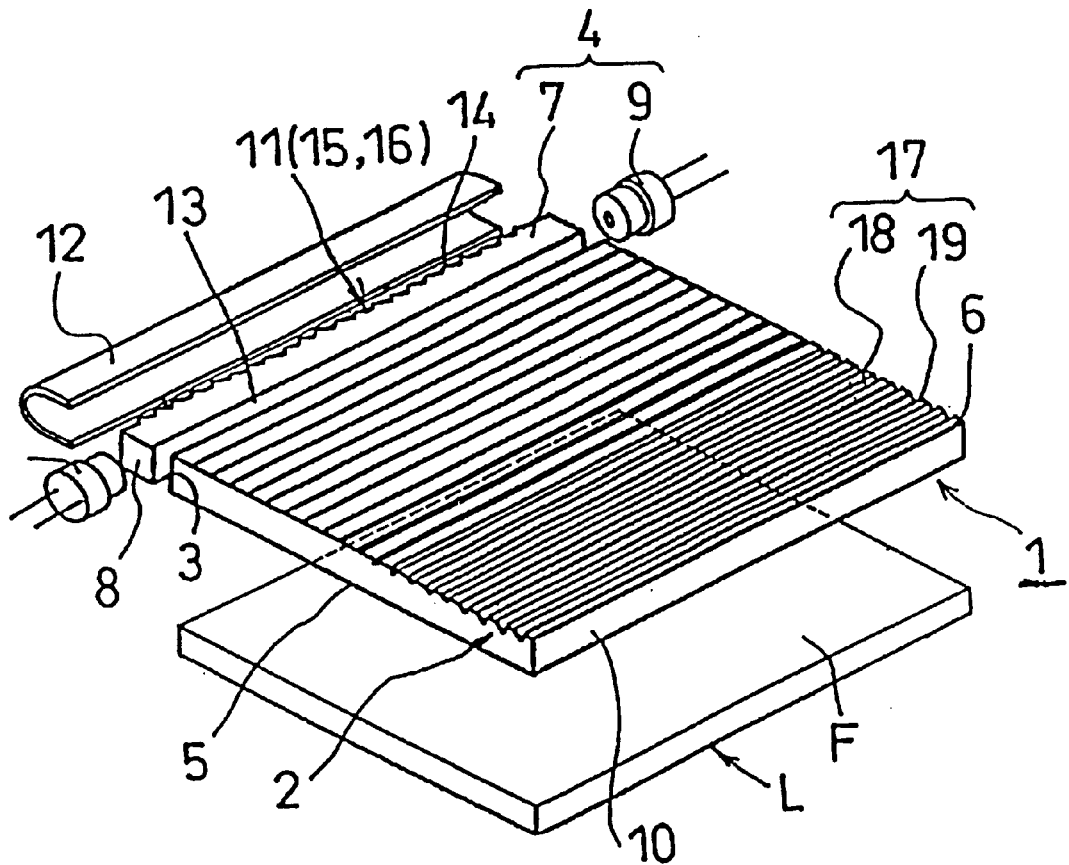
FIG. 4 is a perspective view showing the constitution of a conventional spread illuminating apparatus.

A light conductive member 7 is provided with a plurality of light dispersion portions 15 on a surface 14 located opposite to a surface 13 facing one end surface 3 of a transparent substrate 2 (refer to FIG.4), that is, the other end surface than the one facing the transparent substrate 2, and each of the light dispersion portions is connected to an adjacent light dispersion portion through a plane portion 16, thereby constituting an optical path conversion means 11.

Further, the spacing between the light dispersion portions 15 is set smaller at a spot farther from the spot-like light source 9. This is for supplementing the lowering of the brightness due to getting away from the spot-like light source 9 by increasing the number of the light dispersion portions 15 per unit of the length of the light conductive member 7 to obtain a uniformity in the brightness over the whole light conductive member 7.

Figure 2:
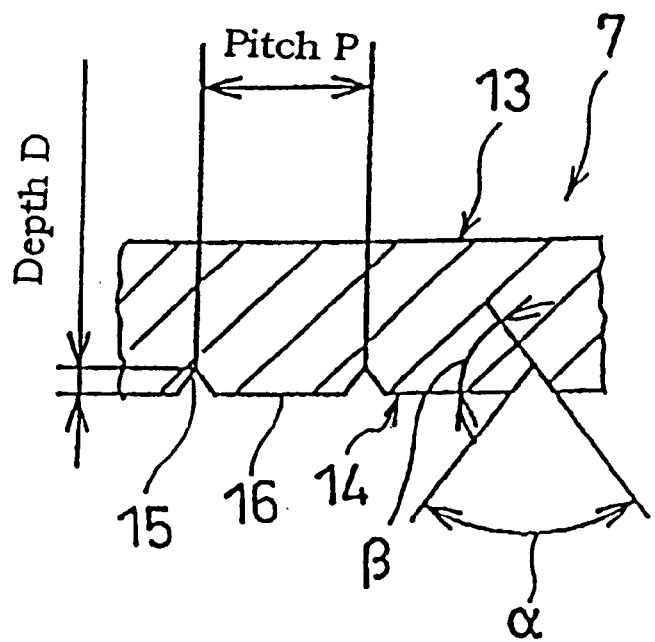
FIG. 2 is an enlarged cross sectional view of the light conductive member of FIG. 1.

FIG. 2 shows an enlarged sectional view of the light conductive member 7. in this embodiment, the light dispersion portions 15 are formed all with a groove with an identical depth D. And, a spacing P (pitch) between the light dispersion portions 15 is set to range from 0.01 mm minimum to 0.2 mm maximum. Accordingly, actually the spacing between the light dispersion portions 15 is smaller than what is shown in FIG. 1.

Now, the reason why the spacing P between the light dispersion portions 15 is set to range from 0.01 mm to 0.2 mm is as follows. In order to inhibit the generation of the stripe pattern of brightness and darkness due to light reflection at the light dispersion portion 15, it is preferable to make the spacing P as small as possible. On the other hand, if the spacing is too small, it is difficult to ensure a workability (here, to obtain a desired precision of the working).

Therefore, the minimum spacing P of 0.01 mm is selected in view of the workability, and the maximum of 0.2 mm is selected in view of the spacing that does not allow a visual recognition of brightness and darkness.

When the spread illuminating apparatus is provided with the light conductive member 7 thus constituted, the generation of the stripe of the pattern of brightness and darkness on the screen F of the reflection-type liquid crystal element L illuminated through the transparent substrate 2 from the light conductive member 7 due to reflection of the light on the light dispersion portion 15 is prevented and the entire screen F can be illuminated uniformly.

Figure 3:
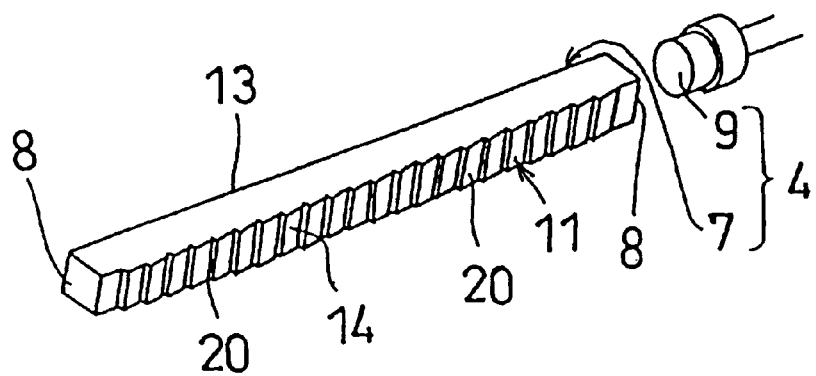
FIG. 3 is a perspective view of an application example of the light conductive member shown in FIG. 1.

FIG. 3 shows, as an example of embodiment variation of the present invention, the optical path conversion means 11 of the light conductive member 7 formed with sawtooth portions approximately triangular in section consisting of two inclined surfaces and disposed continuously without plane portions. Also, in such a structure, a similar operating effect to what is shown in FIG. 1 can be obtained by making the spacing between the sawtooth portions 20 as small as possible while considering the workability.

Figure 5:
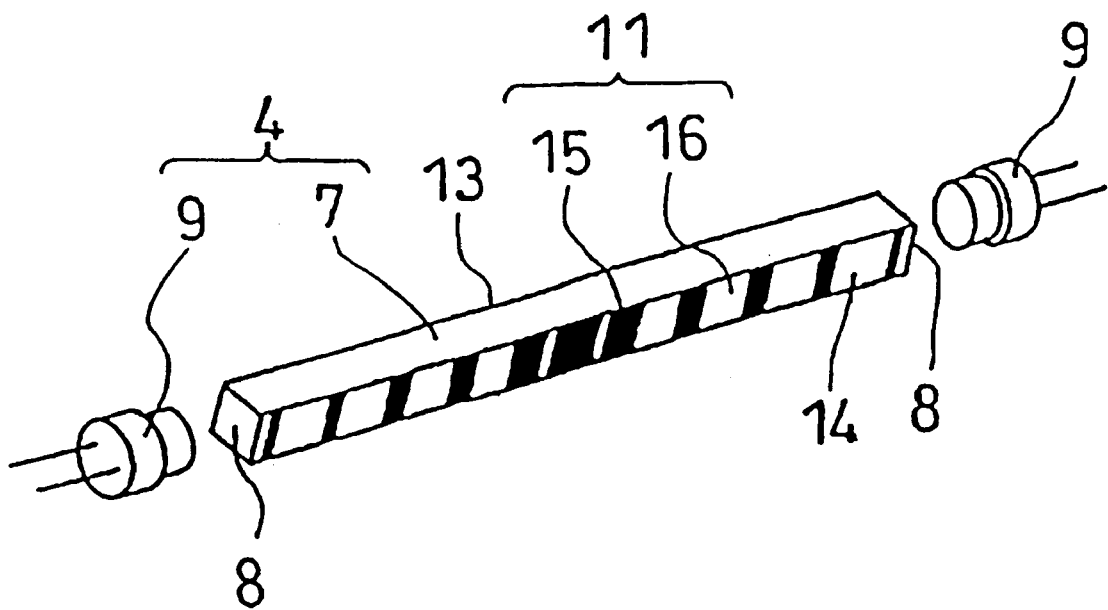
FIG. 5 is an exploded perspective view of the constitution of the light source portion shown in FIG. 4.

Further, by providing the spot-like light source 9 on both ends 8 of the light conductive member 7 as shown in FIG. 5, it is possible to improve the brightness of the spread illuminating apparatus as a whole. However, this structure makes the brightness lowest at the central portion of the light conductive member 7.

In this case, the spacing between the light dispersion portions 15 will be set smallest at the central portion of the light conductive member 7 with gradual increase toward both ends. That is, by increasing the number of the light dispersion portions 15 per unit of length of the light conductive member 7 gradually toward the central portion of the light conductive member 7, the lowering of the brightness due to getting away from the spot-like light source 9 is supplemented to obtain a uniform brightness all over the light conductive member 7.

In addition, two or more light conductive members 7 may be provided in parallel or provided along two or more end surfaces of the transparent substrate 2 to enhance the illuminating capacity further, which is not shown in figures.

For reference, the length of the light conductive member 7 per spot-like light source 9 is preferably set at 30 mm or less, which applies to every above example. The reason is, if the above mentioned length exceeds 30 mm, the lowering of the brightness due to getting away from the spot-like light source 9 becomes so remarkable that unless the spacing between the light dispersion portions 15 is set more than 0.2 mm, it is difficult to keep a uniformity in the brightness over the whole light conductive member 7. Therefore, a light conductive member 7 of 60 mm maximum can be used by providing two spot-like light sources 9 on both ends of the light conductive member 7.

EXAMPLE

Hereinafter, by giving concrete figures to the pitch P, the depth D and so on of the light dispersion portion 15 of the light conductive member 7 shown in FIG. 2, the brightness is compared between the spread illuminating apparatus according to the present invention and the spread illuminating apparatus without the embodiment of the present invention.

In the spread illuminating apparatus of the present invention (hereinafter referred to as "the present invention"), the depth of the light dispersion portion 15 is set D=10 $\mu$m constant, and the pitch P is set 0.1 mm at the central portion of the light conductive member 7 and is increased to 0.2 mm at the both ends of the light conductive member 7. On the other hand, in the spread illuminating apparatus which does not comprise the features of the present invention (hereinafter referred to as "comparison example"), the depth of the light dispersion portion 15 is set D=60 $\mu$m at the central portion of the light conductive member 7 and is decreased to 30 $\mu$m at the both ends, and the pitch is set P=0.5 mm constant. Further, in both the present invention and the comparison example, the length of the light conductive member 7 is 40 mm and the spot-like light source 9 is provided at the both ends 8 of the respective light conductive member 7. And, an apex angle $\alpha$ of the light dispersion portion 15 is 72°, an inclined angle $\beta$ is 54°.

Then, in the case of the present invention, the stripe pattern of brightness and darkness is not generated. On the other hand, in the case of the comparison example, the stripe pattern of brightness and darkness is generated on the screen F of the reflection-type liquid crystal element L illuminated through the transparent substrate 2 due to the reflection of the light beams at the light dispersion portion. Accordingly, in the comparison example, it is necessary to provide a light diffusion layer having a function to diffuse the light between the light conductive member 7 and the transparent substrate 2 in order to inhibit the occurrence of the stripe pattern. However, since the light diffusion layer makes a light permeability lowered in general and a light spread angle becomes larger, the brightness of an illuminating apparatus will be decreased to approximately $\frac{2}{3}$ compared with the present invention. Accordingly, when employing the structure of the comparison example, a spot-like light source 9 with a brightness high enough to overcome the lowering of the brightness due to light diffusion layer is indispensable.

The present invention thus constituted has the following effects. First, according to the first aspect of the present invention, in the side light type of spread illuminating apparatus, the generation of the stripe pattern of brightness and darkness due to the light reflection at the light dispersion portion on the surface illuminated through the transparent substrate can be prevented, so the light can be emitted in a uniformly spread manner.

Further, according to the second aspect of the present invention, the light dispersion portion of the optical path conversion means is formed with the small spacing for preventing the generation of the stripe pattern of brightness and darkness due to the light reflection at the light dispersion portion, and the workability is also considered, so the uniformly spread light emitting can be realized.

Further, according to the third aspect of the present invention, since the uniformity of the brightness is achievable all over the light conductive member, the generation of the stripe pattern of brightness and darkness is prevented while realizing the uniformly spread light emitting.

And, according to the fourth aspect of the present invention, the uniformly spread light emitting is achievable, and as a result the brightness all over the spread illuminating apparatus can be further increased. In addition to above, according to the fifth aspect of the present invention, the uniformly spread light emitting can be ensured.

What is claimed is:

1. A spread illuminating apparatus in which a bar-like light source is disposed close to an end surface of a transparent substrate made of a light permeable material, wherein the bar-like light source is formed with a bar-like light conductive member made of a transparent material, disposed close to and along at least one end surface of the transparent substrate and having a length per spot-like light source set within 30 mm and a spot-like light source disposed to at least one end of the light conductive member, and an optical path conversion means comprising light dispersion portions formed with grooves having an identical depth and spaced from each other at a range from 0.01 mm to 0.2 mm is provided at least on a surface of the light conductive member opposite to the surface facing the transparent substrate.

2. A spread illuminating apparatus according to claim 1, wherein spacing between light dispersion portions of the optical path conversion means is set smaller in accordance with increase of the distance from the spot-like light source.

3. A spread illuminating apparatus according to claim 1, wherein spacing between the light dispersion portions of the optical conversion means is set smallest at a central portion of the light conductive member and is gradually widened toward both ends thereof.

4. A spread illuminating apparatus according to claim 2, wherein spacing between the light dispersion portions of the optical conversion means is set smallest at a central portion of the light conductive member and is gradually widened toward both ends thereof.

* * * * *